United States Patent [19]

Matsumoto et al.

[11] Patent Number: 5,256,107
[45] Date of Patent: Oct. 26, 1993

[54] SLIDING TYPE CONSTANT VELOCITY UNIVERSAL JOINT HAVING REGULATING DEVICE FOR MAINTAINING POSITION OF ROLLER CONSTANT

[75] Inventors: Takumi Matsumoto; Yasuyoshi Yasui; Tsuyoshi Togame, all of Toyota, Japan

[73] Assignee: Toyota Jidosha Kabushiki Kaisha, Toyota, Japan

[21] Appl. No.: 15,670

[22] Filed: Feb. 9, 1993

Related U.S. Application Data

[63] Continuation of Ser. No. 652,426, Feb. 7, 1991, abandoned.

[30] Foreign Application Priority Data

| | | | |
|---|---|---|---|
| Feb. 8, 1990 | [JP] | Japan | 2-27082 |
| Mar. 1, 1990 | [JP] | Japan | 2-19462[U] |
| Mar. 1, 1990 | [JP] | Japan | 2-19463[U] |
| Jul. 6, 1990 | [JP] | Japan | 2-177347 |

[51] Int. Cl.⁵ ............................................. F16D 3/205
[52] U.S. Cl. ............................... 464/111; 464/123; 464/132; 464/905
[58] Field of Search .............. 464/111, 120, 122, 123, 464/124, 132, 905

[56] References Cited

U.S. PATENT DOCUMENTS

| | | | |
|---|---|---|---|
| 3,381,497 | 5/1968 | Allen . | |
| 4,379,706 | 4/1983 | Otsuko et al. | 464/124 X |
| 4,578,048 | 3/1986 | Hirai et al. | 464/111 |
| 4,580,995 | 4/1986 | Orain | 464/111 |
| 4,589,856 | 5/1986 | Mazziotti et al. . | |
| 4,619,628 | 10/1986 | Orain | 464/111 |
| 4,768,994 | 9/1988 | Stenglein | 464/111 |
| 4,778,434 | 10/1988 | Taniyama et al. | 464/111 |
| 4,854,917 | 8/1989 | Mizukoshi | 464/111 |
| 4,891,035 | 1/1990 | Sasaki et al. | 464/111 |
| 4,954,119 | 9/1990 | Sasaki et al. | 464/111 |
| 4,955,847 | 8/1990 | Orain | 464/111 |
| 4,971,595 | 11/1990 | Sasaki et al. | 464/111 |
| 5,019,016 | 5/1991 | Uchman | 404/111 |

FOREIGN PATENT DOCUMENTS

| | | |
|---|---|---|
| 646425 | 1/1989 | Japan . |
| 1188718 | 7/1989 | Japan . |
| 1206121 | 8/1989 | Japan . |
| 1288626 | 11/1989 | Japan . |
| WO90/06451 | 6/1990 | PCT Int'l Appl. . |
| 2099550 | 12/1982 | United Kingdom . |
| 2195167 | 3/1988 | United Kingdom . |
| 2226102 | 6/1990 | United Kingdom . |

*Primary Examiner*—Daniel P. Stodola
*Assistant Examiner*—William G. Battista, Jr.
*Attorney, Agent, or Firm*—Oblon, Spivak, McClelland, Maier & Neustadt

[57] ABSTRACT

An outside member connected to a first shaft is provided on the inner peripheral surface with three grooves extending in the axial direction of the first shaft at circumferentially equal intervals. An inside member connected to a second shaft has roller shafts extending outward in the radial direction of the second shaft so as to respectively enter into the grooves of the outside member, each roller shaft being provided on the outer periphery with a convex spherical surface. A cage provided on the inner periphery with a concave spherical surface is mounted on each roller shaft by fitting the concave spherical surface to the covex spherical surface of the roller shaft. A ring-like roller is rotatably supported by the cage to contact with the outside member. When the first shaft and the second shaft are rotated with a joint angle made between the first and second shafts, the position of the roller relative to the axis of the first shaft is maintained constant. The cage and the roller are capable of moving relative to each other in the radial direction orthogonal to the axis of the first shaft.

8 Claims, 15 Drawing Sheets

SLIDING TYPE CONSTANT VELOCITY UNIVERSAL JOINT HAVING REGULATING DEVICE FOR MAINTAINING POSITION OF ROLLER CONSTANT

This application is a continuation of application Ser. No. 07/652,426, filed on Feb. 7, 1991, now abandoned.

BACKGROUND OF THE INVENTION

1. Field of the Invention

This invention relates to a sliding type or plunging type constant velocity universal joint, and more particularly to a plunging type tripod universal joint suitably incorporated in a drive shaft or the like of a vehicle.

2. Description of the Prior Art

A plunging type tripod universal joint comprises an outside member connected to a first shaft and provided on the inner peripheral surface with three grooves extending in an axial direction of the first shaft at circumferentially equal intervals, an inside member connected to a second shaft and having tripod shafts extending outward in a radial direction of the second shaft so as to respectively enter into the grooves, and a ring-like roller rotatably supported by each tripod shaft and contacting with the outside member.

When the constant velocity universal joint as mentioned above is rotated under the condition that the axes of the first and second shafts cross each other, that is, the first and second shafts make a joint angle to each other, a forced force or axial excitation of the period which is three times larger than the rotational frequency, i.e., a so-called periodic axial force, is generated in the axial direction of the shaft to vibrate a vehicle. As shown in FIG. 17, the axial excitation is generated by a rolling component A resulting from the rolling friction between a roller 20 and a roller groove 21, a spin component B resulting from spin and a sliding component C resulting from the sliding friction between the tripod shaft or the cage and the inner peripheral surface of the roller and the sliding friction between the outer peripheral surface of the roller and the roller groove.

The above-mentioned three components do not uniformly contribute to the generation of the axial excitation. As shown in FIG. 19, the sliding component C has the largest influence on the generation of the axial excitation according to calculation. As shown in FIG. 18, since portions of contact of the roller 20 with the roller groove 21 are always located on a normal plane of an axis of an outside member 22, the sliding component C is mainly based on the fact that the direction of a frictional force f is deflected from a reaction component $F_1$ of a drive force F by an angle $\theta$ to generate a residual component $f_1$ of the frictional force f.

While there have been many proposals for reducing the axial excitation, the proposals related to the present invention are disclosed in Japanese Patent Public Disclosures (KOKAI) No. 1-288626, No. 63-158327 and No. 54-132046 and Japanese Utility Model Public Disclosure (KOKAI) No. 64-6425.

According to a constant velocity universal joint disclosed in the reference 1-288626, a roller is composed of an inner ring, an intermediate ring and an outer ring. The inner ring of the roller is mounted on a tripod shaft through a needle bearing such that the rotation alone of the inner ring is possible. The outer periphery of the inner ring of the roller is formed into a spherical surface having the center on an axis of the tripod shaft. The spherical surface of the inner ring of the roller is brought into spherical contact with the inner periphery of the intermediate ring of the roller, and the outer periphery of the intermediate ring of the roller is formed into a cylindrical surface along an axis of the intermediate ring of the roller, so that the inner periphery of the outer ring of the roller is fitted to the cylindrical surface of the intermediate ring of the roller.

According to a constant velocity universal joint disclosed in the reference 64-6425, an inside roller is slidably fitted to a tripod shaft. The outer periphery of the inside roller is formed into a convex spherical surface having the center on an axis of the tripod shaft. A holder having a concave spherical surface adapted for fitting to the convex spherical surface of the inside roller is swingably fitted to the inside roller, and an outside roller is rotatably mounted on the holder. The holder is provided with a flange for restraining the inclination of the holder.

According to a constant velocity universal joint disclosed in the reference 63-158327, a roller is composed of an outer ring provided on the outer periphery with a cylindrical surface, an inner ring fitted to a tripod shaft and a plurality of needle rollers disposed between the outer ring and the inner ring. The outer periphery of the tripod shaft is formed into a convex spherical surface having the center on an axis of the tripod shaft, and the inner ring has a concave spherical surface adapted for fitting to the convex spherical surface of the tripod shaft. In this universal joint, two groove surfaces of a groove on an outside member for inserting the tripod shaft are formed as parallel planes, and the outer ring rolls on these parallel planes. The outer ring is swingable in a plane parallel to the plane including the axes of three tripod shafts.

According to a constant velocity universal joint disclosed in the reference 54-132046, a tripod shaft or a guide ring mounted on the tripod shaft is provided with a convex spherical surface having the center on an axis of the tripod shaft, and an concave spherical surface of a cage is fitted to the convex spherical surface to permit a roller to swing relative to the tripod shaft.

In order to reduce the above-mentioned periodic axial force, it is most effective to reduce the sliding component. In this connection, when two shafts are rotated with the joint angle made between the two shafts, it is preferable to eliminate the residual component of the frictional force as mentioned above by maintaining the positions of all parts between the tripod shaft and the outside member, i.e., the roller, the needle rollers, the cage or the like relative to the axis of the outside member constant such that the sliding frictional force among the parts is generated on the normal plane to the axis of the outside member.

In the constant velocity universal joint disclosed in the reference 1-288626, when the two shafts are rotated with the joint angle made between the two shafts, the inner ring of the roller united with the tripod shaft by a snap ring slides on the intermediate ring of the roller through their spherical surfaces, and the intermediate ring of the roller slides on the outer ring of the roller in the axial direction of the intermediate ring of the roller. As a result, the positions of the outer ring and the intermediate ring of the roller relative to the roller groove are maintained constant. Since the intermediate ring of the roller is moved relative to the outer ring of the roller in the radial direction orthogonal to the axis of the outside member, the sliding component as mentioned above is reduced. On the other hand, since the position of the inner ring of the roller is not maintained constant relative to the axis of the outside member, the needle rollers disposed between the tripod shaft and the inner ring of the roller are inclined due to the inclination of the tripod shaft, so that the needle rollers do not fulfill their inherent function to the rotation of the outer ring of the roller. Therefore, the sliding surface during the rotation of the outer ring of the roller is not defined, and besides, the surfaces of the sliding portions make contact with each other. As a result, in the universal joint, the sliding component is reduced, while the sliding friction is included in the rolling component.

In the constant velocity universal joint disclosed in the reference 64-6425, when the two shafts are rotated with the joint angle made between the two shafts, the tripod shaft swings together with the inside roller, while the inclination of the holder is restrained by the flange. As a result, the position of the outside roller relative to the roller groove is maintained constant. On the other hand, the tripod shaft is moved relative to the inside roller in the axial direction of the tripod shaft, so that the residual component of the sliding frictional force results in the axial excitation.

In the constant velocity universal joint disclosed in the reference 63-158327, the parts between the tripod shaft and the outer ring are substantially united, and it is intended that the sliding frictional force is not generated. However, in the rotation of the tripod universal joint with the joint angle, an output shaft always oscillates three times per one rotation, and the oscillations of the output shaft are absorbed by the spherical surface contact of a spherical bushing with the inner ring and the sliding movement between the outer ring and the outside member. The residual component of the sliding frictional force generated between the outer ring and the outside member results in the axial excitation, since the position of the outer ring is not constant relative to the axis of the outside member.

In the constant velocity universal joint disclosed in the reference 54-132046, when the two shafts are rotated with the joint angle made between the two shafts, the roller is actually inclined together with the cage, since nothing regulates the inclination of the roller. As a result, the sliding component is generated, or when the inclination of the roller is regulated, the axial excitation is generated by the sliding frictional force, similarly to the case of the universal joint disclosed in the above-mentioned reference 64-6425.

SUMMARY OF THE INVENTION

An object of the present invention is to provide a plunging type constant velocity universal joint capable of reducing as much as possible the sliding component having an influence on a periodic axial force.

A plunging type constant velocity universal joint according to the present invention comprises an outside member connected to a first shaft and provided on the inner peripheral surface with at least three grooves extending in an axial direction of the first shaft at circumferentially equal intervals, and an inside member connected to a second shaft and having roller shafts extending outward in the radial direction of the second shaft so as to respectively enter into the grooves, each roller shaft being provided on the outer periphery with a convex spherical surface. A cage provided on the inner periphery with a concave spherical surface is mounted on each of the roller shafts by fitting the concave spherical surface to the convex spherical surface of the roller shaft, and a ring-like roller is rotatably supported by each cage to contact with the outside member. The universal joint further comprises regulating means for maintaining the position of each roller relative to the axis of the first shaft constant when the first shaft and the second shaft are rotated with the joint angle made between the first and second shafts. The cage is movable relative to the roller in a radial direction orthogonal to the axis of the first shaft.

-When the first shaft and the second shaft are rotated with the joint angle made between the first and second shafts, each roller shaft is displaced in the axial direction of the first shaft by the action of the convex spherical surface of the roller shaft itself and the concave spherical surface of the cage. By the displacement of the roller shafts, each cage is moved relative to the roller in the radial direction orthogonal to the axis of the first shaft, while the position of each roller relative to the axis of the first shaft is maintained constant by the regulating means. As a result, each roller rolls on the outside member as maintaining its position, and is moved in the axial direction of the first shaft.

When the two shafts are rotated with the joint angle made between the two shafts, the residual component of the frictional force as mentioned above is eliminated by maintaining the positions of all parts between the roller shaft and the outside member constant. Therefore, the sliding component having the largest influence on the periodic axial force is extremely reduced. As a result, the axial excitation is substantially reduced, and the vibrations applied to a vehicle are reduced, so that the riding comfort is improved.

Preferably, the roller is rotatably supported by the cage through needle rollers. In this case, a guide for supporting the needle rollers and a retainer for preventing the needle rollers from dropping out may be provided on the outer peripheral surface of the cage, in addition to the inner peripheral surface of the roller. It is more advantageous that the guide and the retainer are provided on the inner peripheral surface of the roller, for the reasons described as follows:

When the guide and the retainer are provided on the inner peripheral surface of the roller, the outer diameter of the cage is capable of being held small. As a result, the interference of the cage with the roller shaft is delayed when the cage is moved relative to the roller shaft as the roller shaft displaces. Thus, the allowable joint angle is capable of being made large. Further, since the case is made compact, while the pitch circle diameter of the torque-transmitting surface of the cage is made large, a design advantageous to the strength is attainable.

When the retainer is formed integrally with the roller as a part of the roller, a snap ring or the like for fixing a retainer formed separately from the roller is no longer needed, so that the axial length of the roller is correspondingly reduced. Therefore, the constant velocity universal joint is reduced in size and weight.

In order to prevent the cage from the rotation, it is preferable that a rail extending in the axial direction of the first shaft and projecting radially inward is provided in each groove of the outside member, and two notches for receiving the rail are provided in portions of the cage facing the rail. On the other hand, in case the guide and the retainer are located on the inner peripheral surface of the roller, when the two shafts are rotated with the joint angle made between the two shafts, the edge of each notch abuts against the needle rollers. Thus, the needle rollers are liable to be damaged. Then, the vicinity of each notch on the outer peripheral surface of the cage contacting with the needle rollers is preferably formed into a convex curved surface toward the needle rollers, thereby preventing the edge from abutting against the needle rollers.

The two notches of the cage may be formed substantially parallel to the first shaft, or each of the two notches may be formed such that the notch is diverged from the inner peripheral surface toward the outer peripheral surface of the cage. In case each notch is a divergent form, when the two shafts are rotated with the joint angle made between the two shafts, the cage is rotated by interlocking with the displacement of the roller shaft, so that the sliding movement to a direction between the cage and the roller shaft is somewhat restrained. Further, the generation of the sliding friction between the rail and the notch is restrained.

It is advantageous that the regulating means for maintaining the position of each roller constant is constructed from the rail of the outside member. In this case, a pair of roller grooves permitting the roller to roll thereon are provided in each groove of the outside member, and the position of the roller is maintained constant by the inside surface of the rail and two shoulders of the roller grooves. Thus, the shape of the roller is made simple.

It is preferable that each roller groove has a guide surface spaced apart from each shoulder in the axial direction of the roller, and the inside surface of the rail and the guide surfaces in each groove are located on the same plane. Thus, the number of surfaces for supporting the roller by the outside member is increased, so that the slidable distance of the roller from an opening of the outside member to the outside is enlarged.

BRIEF DESCRIPTION OF THE DRAWINGS

Other objects and features of the invention will become apparent from the following description of preferred embodiments of the invention with reference to the accompanying drawings, in which:

FIG. 3 shows an embodiment of a cage, in which

FIG. 4 shows another embodiment of the cage, in which

FIG. 8 shows a further embodiment of the cage, in which

FIG. 9 shows a still further embodiment of the cage, in which

FIG. 12 shows the cage shown in FIGS. 10 and 11, in which

FIGS. 15 and 16 are sectional views taken along a plane including the axis of the shaft of the joint shown in FIG. 14, in which FIG. 15 shows the condition that two shafts make a joint angle therebetween, and a roller is located in an opening portion of an outside member, and FIG. 16 shows the condition that two shafts are aligned with each other.

DETAILED DESCRIPTION OF THE PREFERRED EMBODIMENTS

Figure 1:
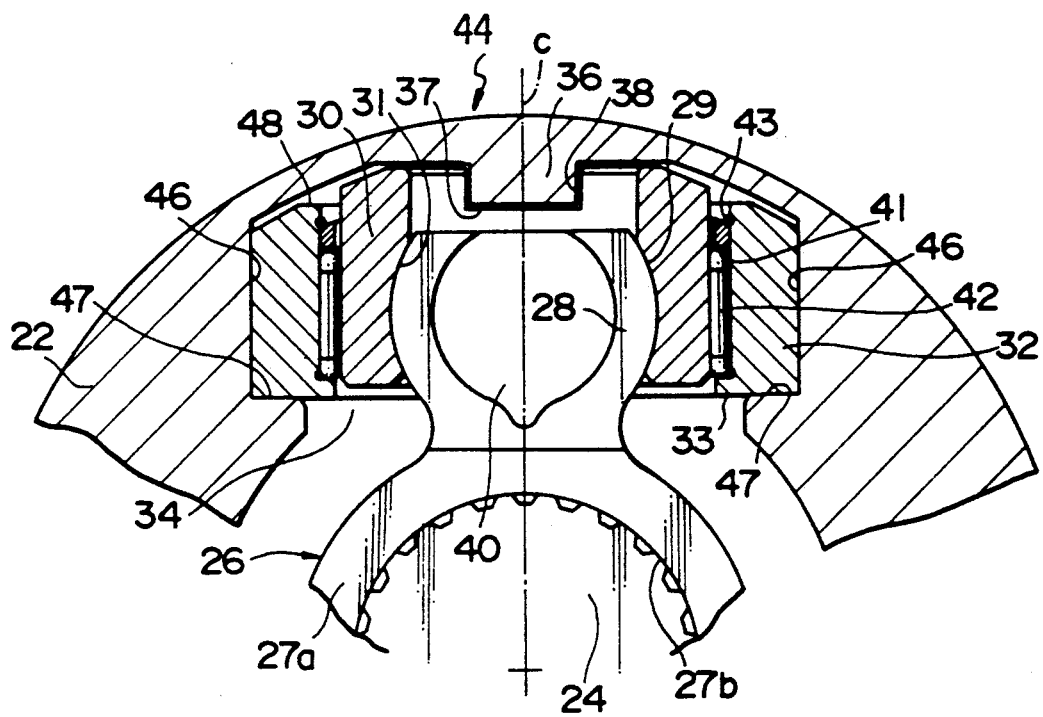
FIG. 1 is a fragmentary sectional view taken along a plane orthogonal to an axis of a shaft of a plunging type constant velocity universal joint according to the present invention.
Figure 2:
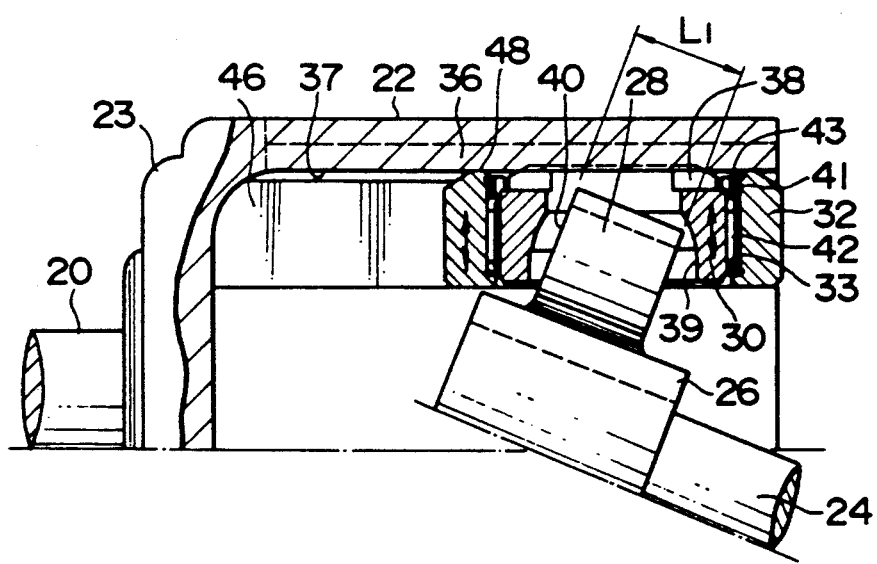
FIG. 2 is a sectional view showing the upper half taken along a plane including the axis of the shaft of the plunging type constant velocity universal joint under the condition that two shafts make a joint angle therebetween.

As shown in FIGS. 1 and 2, a plunging type constant velocity universal joint comprises an outside member 22 connected to a first shaft 20, an inside member 26 connected to a second shaft 24, roller shafts 28, cages 30 and rollers 32.

The outside member 22 has three grooves 34 (only one is shown in the drawing) extending in an axial direction of the shaft 20 and arranged circumferentially at equal intervals on the inner peripheral surface. The number of the grooves 34 may be selected as four or five or others. The outside member 22 is united with the shaft 20 through a connecting portion 23, and the opposite end of the connecting portion 23 is opened.

The inside member 26 has the roller shaft 28 extending radially outward of an axis of the second shaft 24 so as to enter into each of the three grooves 34 of the outside member 22. The outer periphery of the roller shaft 28 is formed as a convex spherical surface 29 having the center on an axis C.

In the embodiment shown, the inside member 26 is provided with a cylindrical boss 27a, and three roller shafts 28 (only one is shown in the drawing) protrude integrally from portions of the boss 27a circumferentially positioned at equal intervals so that the axis C is orthogonal to the axis of the shaft 24. A spline 27b is provided on the inner peripheral surface of the boss 27a, and the shaft 24 extending in the opposite direction to the shaft 20 is spline-coupled to the boss 27a. The boss 27a and the roller shafts 28 of the inside member 26 and the shaft 24 are introduced into the inside of the outside member 22 through an opening of the outside member 22.

Figure 3A:
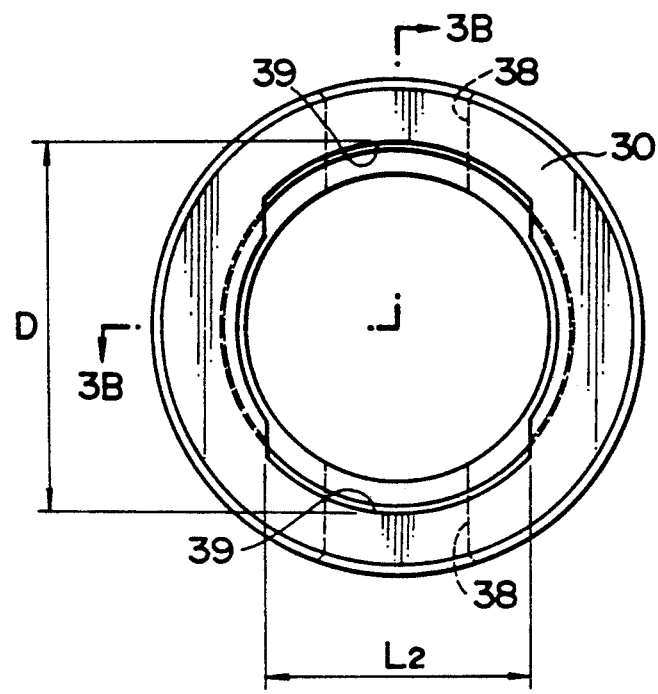
FIG. 3(a) is a bottom view.
Figure 3B:
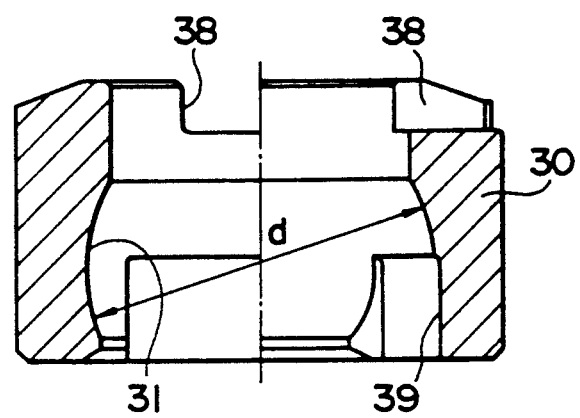
FIG. 3(b) is a sectional view taken along a line 3B—3B in FIG. 3(a)

The cage 30 has a concave spherical surface 31 provided on the inner periphery. The outer periphery of the cage 30 is a so-called cylindrical surface having a circular section. As shown in FIG. 3, the cage 30 is provided diametrically with two groove-like notches 38 for respectively receiving a rail 36 provided on the outside member 22. The concave spherical surface 31 is in a form tightly fitting to the convex spherical surface 29 to surely come into contact with the convex spherical surface 29 when these notches 38 are arranged, as shown in FIG. 1, in the axial direction of the shaft 24.

The convex spherical surface 29 of the roller shaft 28 is partly cut to provide a width across flat portion 40, and the cage 30 is provided with undercuts 39 at two portions. The undercuts 39 correspond in position to the two notches 38 respectively. The width across flat portion 40 is orthogonal to the axis of the shaft 24, and the width $L_1$ (See FIG. 2) of the width across flat portion 40 is smaller than the minimum distance $L_2$ (See FIG. 3) of a portion of the cage 30 having no undercut 39. On the other hand, the size of the undercut 39 is determined so that its diameter D makes larger than the bore d of the concave spherical surface 31 of the cage 30.

The convex spherical surface 29 of the roller shaft 28 is opposed to the undercut 39 when the portion of the cage 30 having no undercut 39 is disposed along the width across flat portion 40 of the roller shaft 28. In this condition, the cage 30 is fitted in the roller shaft 28, and then the cage 30 is rotated by 90°. As a result, the cage 30 takes its predetermined position shown in FIG. 1 relative to the roller shaft 28, and the concave spherical surface 31 comes into contact with the convex spherical surface 29.

The roller 32 is rotatably supported by the cage 30 and contacts with the outside member 22. In the embodiment shown, the roller 32 is formed in a cylindrical form and mounted on the cage 30 through needle rollers 42. A guide 33 projecting radially inward of the roller 32 and circumferentially extending the whole periphery is provided on an inner peripheral portion of the roller 32, the guide 33 being positioned radially inward relative to the axis of the shaft 24. The projecting length of the guide 33 is slightly smaller than the diameter of the needle roller 42. An annular retainer 41 is disposed outside the needle roller 42, and a snap ring 43 is fitted to the inner periphery of the roller 32 to retain the retainer 41, so that the needle roller 42 is prevented from dropping out.

Since the outer peripheral surface of the cage 30 is formed as a cylindrical surface, the roller 32 is formed in a cylindrical form, and the size of the guide 33 of the roller 32 is smaller than the diameter of the needle roller 42, the cage 30 and the roller 32 are movable relative to each other in the axial direction of the roller 32.

The constant velocity universal joint is provided with regulating means 44 for maintaining the position of each roller 32 relative to the axis of the first shaft 20 constant when the first shaft 20 and the second shaft 24 are rotated with a joint angle made between the first and second shafts. In the embodiment shown, the regulating means 44 is composed of the rail 36 projecting into each of the grooves 34 of the outside member 22 and extending in the axial direction of the shaft 20 on the central portion of the groove 34, and a pair of roller grooves 46 formed on two groove surfaces of the groove 34 and extending in the axial direction of the shaft 20.

The rail 36 is fitted in the two notches 38 of the cage 30 and movably supports the cage 30 in the axial direction of the shaft 20. When a bottom surface of the notch 38 of the cage 30 abuts against an inside surface 37 of the rail 36, the rail 36 prevents the cage 30 from being moved outward in the radial direction orthogonal to the axis of the shaft 20. On the other hand, the inside surface 37 of the rail 36 comes into contact with a surface 48 of the roller 32 located radially outward relative to the axis of the shaft 20. As a result, the roller 32 is regulated by the respective shoulders 47 of the two roller grooves 46 and the inside surface 37 of the rail 36, so that the position of the roller 32 relative to the axis of the first shaft 20 is maintained constant. That is, the roller 32 moves along the roller grooves 46 such that the rotary axis of the roller 32 is always orthogonal to the axis of the first shaft 20.

Since the roller 32 is regulated by the regulating means 44 as mentioned above, and the cage 30 is movable relative to the roller 32, the cage 30 and the roller 32 are movable relative to each other in the radial direction orthogonal to the axis of the first shaft 20. If the cage 30 and the roller 32 are constituted as mentioned above, the sliding distance between the cage 30 and the roller 32 results in the shortest, so that the durability of the cage and the roller is improved.

Figure 4A:
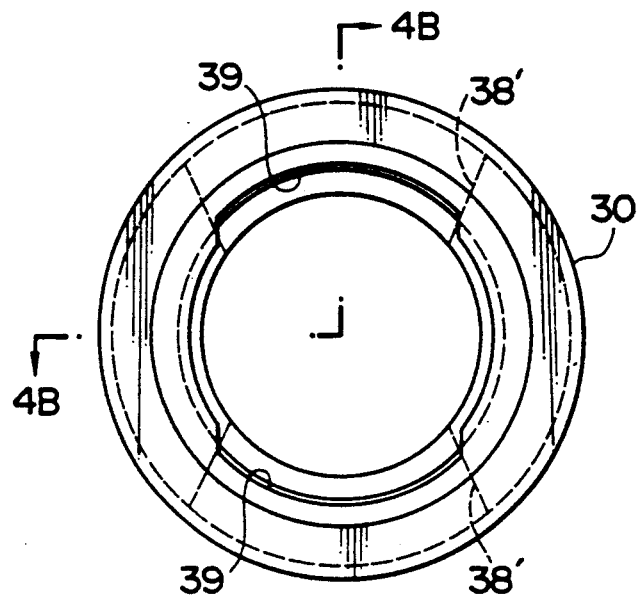
FIG. 4(a) is a bottom view.
Figure 4B:
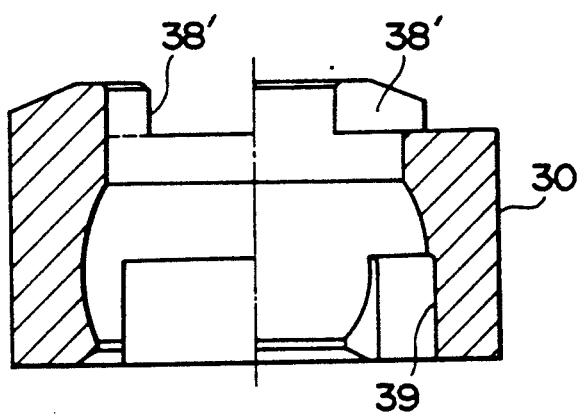
FIG. 4(b) is a sectional view taken along a line 4B—4B in FIG. 4(a)

If the rail 36 is fitted in the notches 38 of the cage 30 as the aforementioned embodiment, since the positioning of the cage 30 is ensured by the rail 36, it is preferably. As shown in FIG. 4, when each of the notches 38' provided in the cage 30 is diverged from the inner peripheral surface toward the outer peripheral surface of the cage 30, the cage 30 can be rotated with the roller shaft 28 within the range of the notch 38'.

Figure 5A:
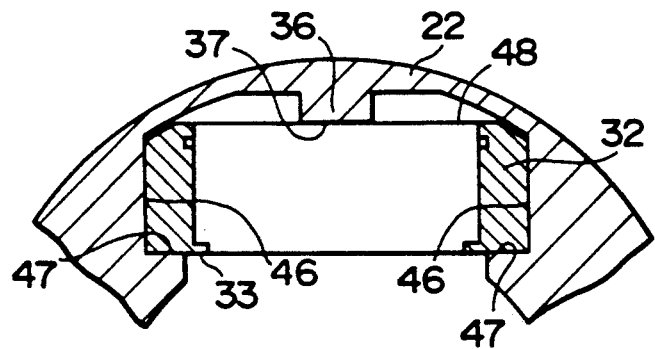
FIGS. 5(a), 5(b) and 5(c) are sectional views showing different embodiments of a roller, respectively.
Figure 5B:
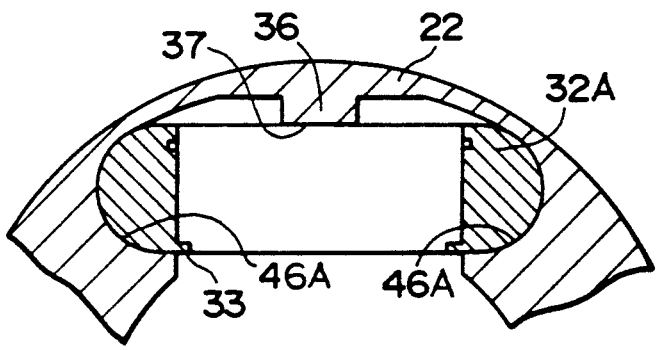
Figure 5C:
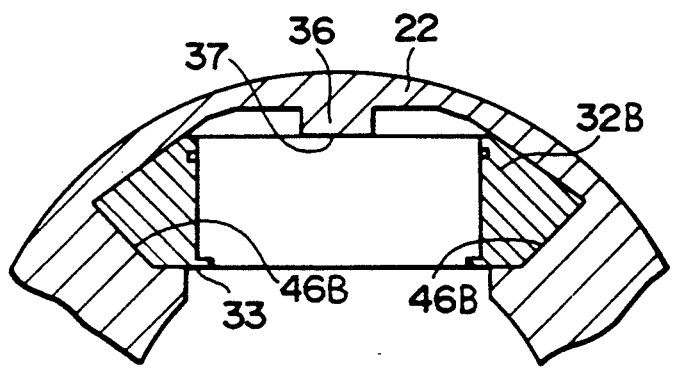

In order to maintain the position of the roller 32 relative to the axis of the first shaft 20 constant, the roller 32 needs to be supported by at least three points. FIG. 5 shows embodiments of such support of the roller 32. In FIG. 5(a), which is the same as that shown in FIGS. 1 and 2, the roller 32 is supported by the inside surface 37 of the rail 36 and the respective shoulders 47 of the two roller grooves 46. In FIG. 5(b), the outer peripheral surface of the roller 32A is formed to have a semicircular in section, and the roller groove 46A is formed to have an approximately semicircular in section, so that the roller 32A is supported by the inside surface 37 of the rail 36 and a line of contact of the outer peripheral surface of the roller 32A with the roller groove 46A. In FIG. 5(c), the outer peripheral surface of the roller 32B is formed to have an approximately triangular in section, and the roller groove 46B is formed to have an approximately triangular section, so that the roller 32 is supported by the inside surface 37 of the rail 36 and a plurality of lines of contact of the outer peripheral surface of the roller 32B with the roller groove 46B.

Instead of providing the rail in the above-mentioned embodiment, if the groove 34 of the outside member 22 is worked such that the inside surface of the outside member 22 is flush with the inside surface 37 of the rail 36, the position of the roller is regulated by the inside surface itself of the outside member 22. In this case, the rotation of the cage 30 is stopped by separate means.

As shown in FIG. 2, when the first shaft 20 and the second shaft 24 are rotated with a joint angle made between the first and second shafts, the roller shaft 28 is displaced in the axial direction of the first shaft 20 by the action of the convex spherical surface of the roller shaft itself and the concave spherical surface of the cage 30. The cage 30 slides on the needle roller 42 with the displacement of the roller shaft 28, so that the cage 30 is moved relative to the roller 32 in the radial direction orthogonal to the axis of the first shaft 20. And the roller 32 is moved in the axial direction of the first shaft 20 without changing its position relative to the axis of the first shaft 20, since the position of the roller 32 is regulated by the regulating means.

Figure 6:
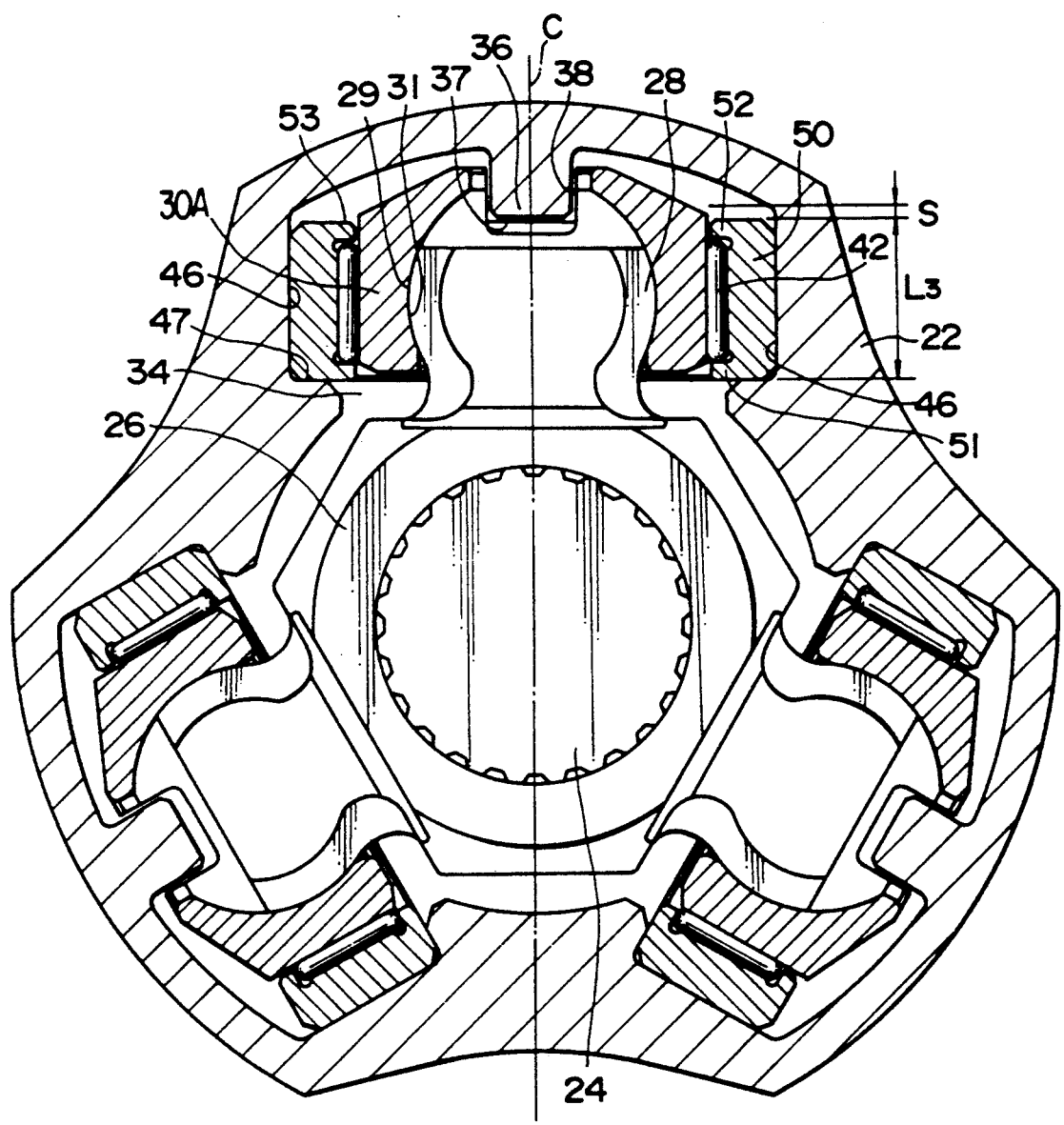
FIG. 6 is a sectional view taken along a plane orthogonal to an axis of a shaft of another embodiment of the plunging type constant velocity universal joint according to the present invention.
Figure 7:
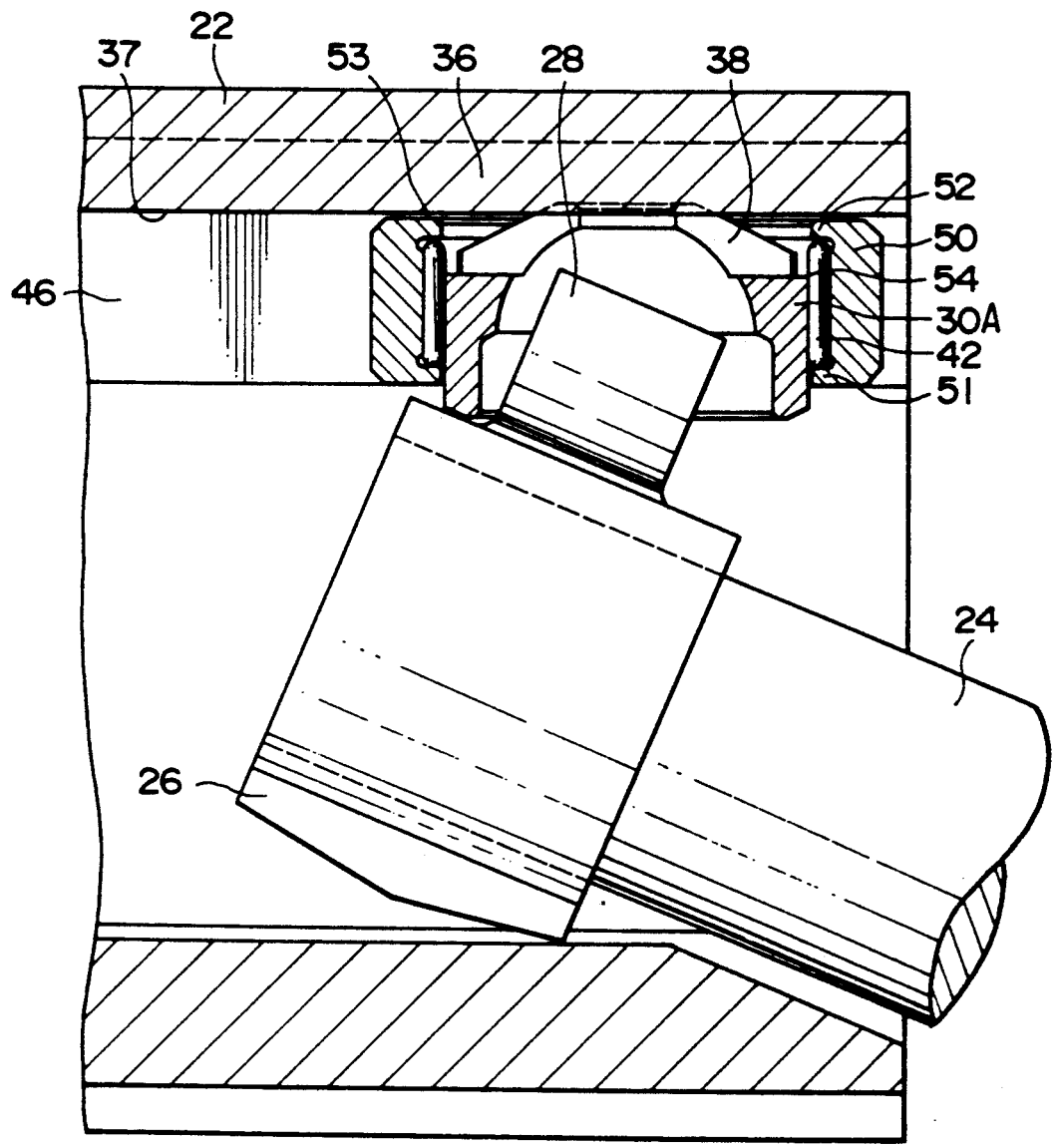
FIG. 7 is a sectional view taken along a plane including the axis of the shaft of the joint shown in FIG. 6 under the condition that two shafts make a joint angle therebetween.

Since the basic constitution of a plunging type constant velocity universal joint shown in FIGS. 6 and 7 is the same as that of the joint shown in FIGS. 1 and 2, the parts having the same constitution or the same function are designated by the same numerals and symbols, and the detailed description thereof will be omitted.

In this embodiment, a roller 50 is different from the roller 32. That is, the roller 50 is provided on its inner periphery with a guide 51 and a retainer 52 which are united with the roller 50. The guide 51 is located at an inner peripheral portion of the roller 50 radially inward relative to the axis of the shaft 24, and the retainer 52 is located at an inner peripheral portion of the roller 50 radially outward relative to the axis of the shaft 24. The guide 51 and the retainer 52 project inward in the radial direction of the roller 50 and circumferentially extend over the whole periphery of the roller 50. The projecting length of each of the guide 51 and the retainer 52 is slightly smaller than the diameter of the needle roller 42. The needle rollers 42 are held by the guide 51 and the retainer 52. The surface 53 of the retainer 52 located outward relative to the axis of the shaft 24 is flush with the end face of the roller 50 to come into contact with the inside surface 37 of the rail 36.

Since the constant velocity universal joint shown in FIGS. 6 and 7 dispenses with any snap ring, the axial length $L_3$ of the roller 50 is shortened by the length corresponding to a groove for the snap ring and a holding wall portion for providing the groove (See FIG. 5) extending from the end face of the roller for providing the groove to the groove for the snap ring, and a clearance S between the roller 50 and the outside member 22 is enlarged. This means that the outside member 22 is correspondingly reduced in size and weight.

Also, since the outside surface 53 of the retainer 52 is flush with the end face of the roller 50, a portion of the roller 50 facing the rail 36 easily ensures a wide flat surface. Thus, the movement of the roller 50 is surely regulated by the rail 36, and the position of the roller 50 relative to the outside member 22 is easily maintained constant.

Even if the length $L_3$ of the roller 50 is shortened, the portion of the roller 50 facing the rail 36 easily ensures the wide flat surface, and a predetermined length of the needle roller 42 is ensured. Therefore, assuming that the clearance S between the roller 50 and the outside member 22 is made equal to that in the joint shown in FIGS. 1 and 2, the outer diameter of the roller 50 may be correspondingly enlarged. When the outer diameter of the roller 50 is enlarged, the needle rollers 42 permits to be disposed outward relative to the roller shaft 28, so that the number of the needle rollers is increased. Accordingly, the strength and life are improved.

If the projecting length of the rail 36 is elongated corresponding to a shortened portion of the roller 50, the length of action between the cage 30A and the rail 36 in case of enlarging the joint angle is made sufficient to increase the allowable joint angle.

The snap ring and the separately manufactured retainer are dispensed with, and eventually the number of parts is reduced.

Figure 8A:
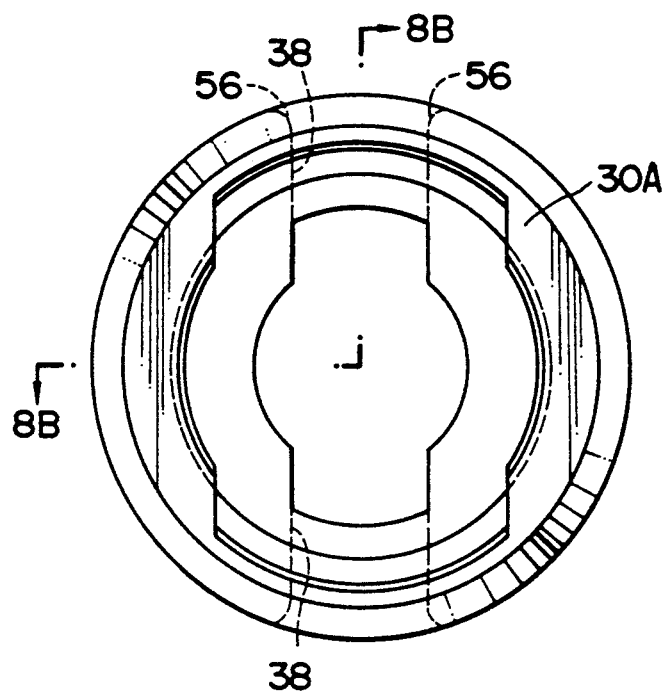
FIG. 8(a) is a bottom view.
Figure 8B:
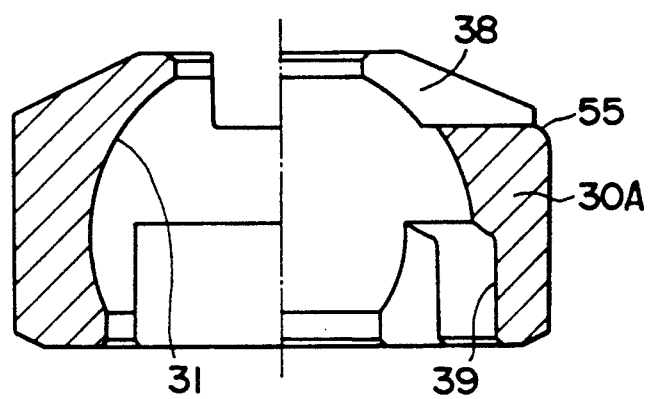
FIG. 8(b) is a sectional view taken along a line 8B—8B in FIG. 8(a)
Figure 9A:
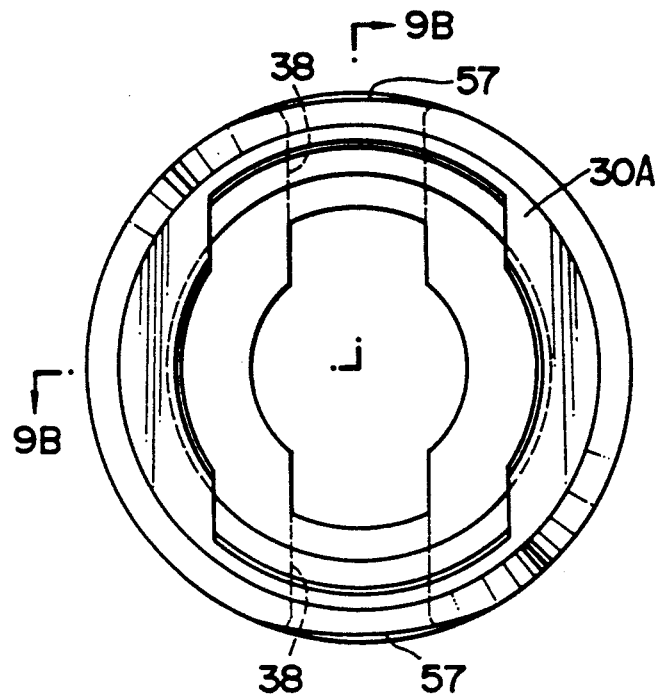
FIG. 9(a) is a bottom view.
Figure 9B:
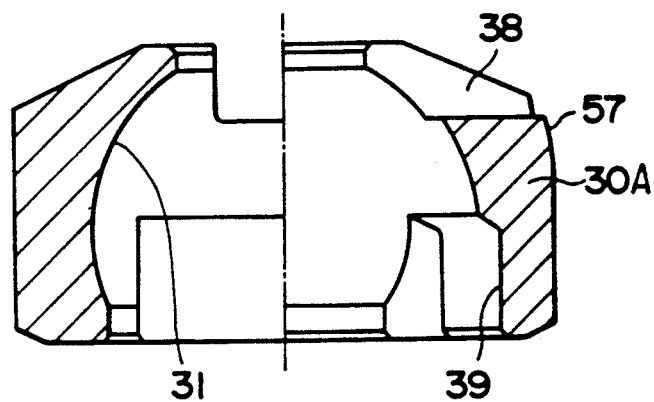
FIG. 9(b) is a sectional view taken along a line 9B—9B in FIG. 9(a)

As shown in FIG. 7, when the two shafts are rotated with the joint angle made between the two shafts, the edge 54 of the notch 38 of the cage 30A abuts against the needle roller 42. Then, as shown in FIGS. 8 and 9, the vicinity of each notch 38 on the outer peripheral surface of the cage 30A contacting with the needle roller 42 is preferably formed into a convex curved surface toward the needle roller. In FIG. 8, a small-radius rounded end 55 is formed below the notch 38, and small-radius rounded ends 56 are respectively formed on both sides of the notch 38. In FIG. 9, a crown 57 having a gradual curve as a whole is formed below the notch 38.

As a result that the notch 38 of the cage 30A is restricted by the rail 36, it is always spaced about 90° from a torque-transmitting surface. In other words, this means that the needle roller 42 facing the notch 38 does not directly share in the torque transmission. Thus, if the needle roller 42 is prevented by the curved surface of the cage from the interference with the edge due to the inclination of the cage relative to the needle roller when the cage is moved relative to the roller, the needle roller is prevented from the damages to elongate the life of the needle roller.

Figure 10:
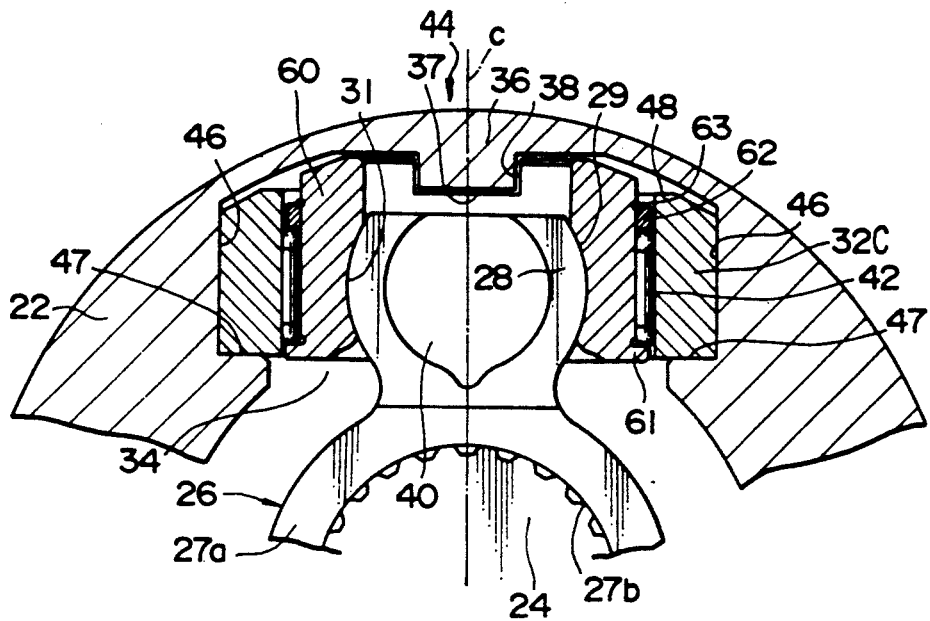
FIG. 10 is a fragmentary sectional view taken along a plane orthogonal to an axis of a shaft of a further embodiment of the plunging type constant velocity universal joint according to the present invention.
Figure 11:
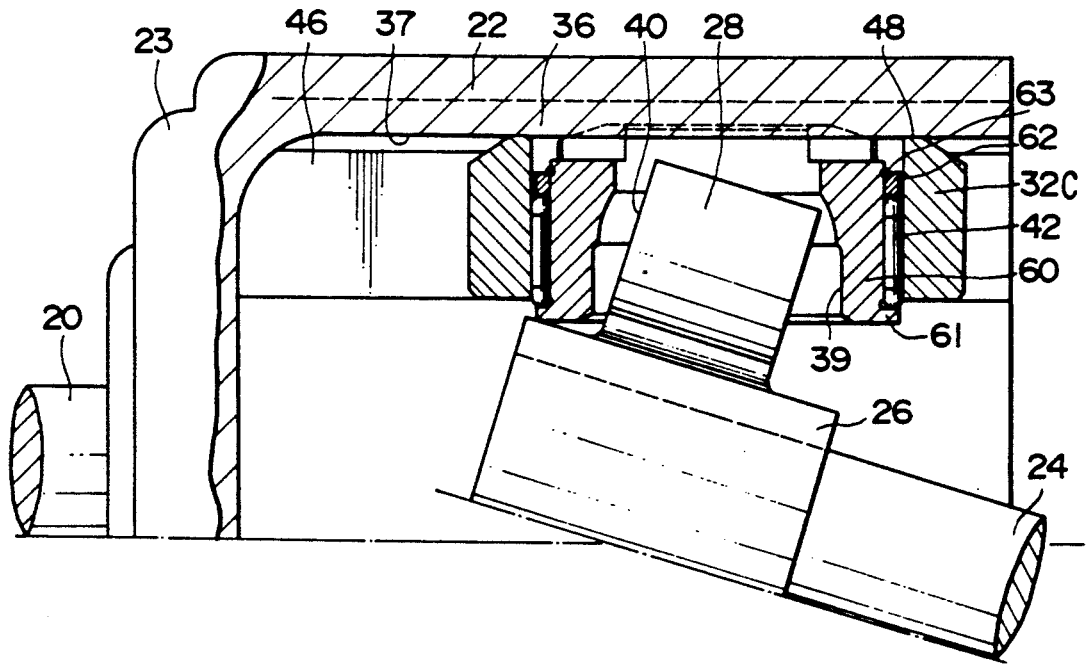
FIG. 11 is a sectional view showing the upper half taken along a plane including the axis of the shaft of the joint shown in FIG. 10 under the condition that two shafts make a joint angle therebetween.

Since the basic constitution of a plunging type constant velocity universal joint shown in FIGS. 10 and 11 is the same as that of the joint shown in FIGS. 1 and 2, the parts having the same constitution or the same function are designated by the same numerals and symbols, and the detailed description thereof will be omitted.

In this embodiment, a cage 60 is provided on its outer periphery with a guide 61. A retainer 62 is fixed by a snap ring 63 mounted on the outer periphery of the cage 60, while a roller 32C has no guide and retainer and the needle rollers 42 are held by the guide 61 and the retainer 62. As shown in FIG. 11, when the two shafts are rotated with the joint angle made between the two shafts, the interference of the cage 60 with the inside member 26 is advanced, that is, such interference occurs with a small joint angle, since the guide 61 is provided on the cage 60. Therefore, the precedent embodiments are preferable to this embodiment, when the whole size of the joint needs to be made small and the joint angle needs to be enlarged.

Figure 12A:
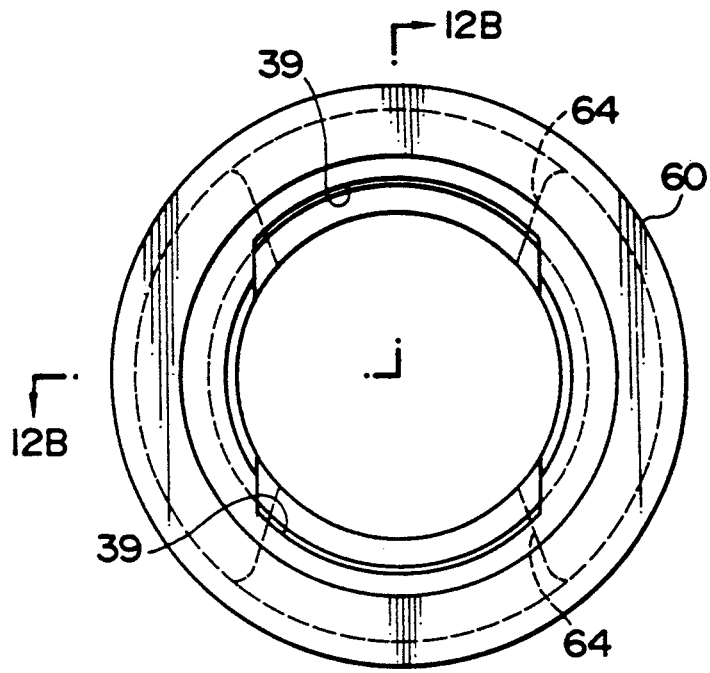
FIG. 12(a) is a bottom view.
Figure 12B:
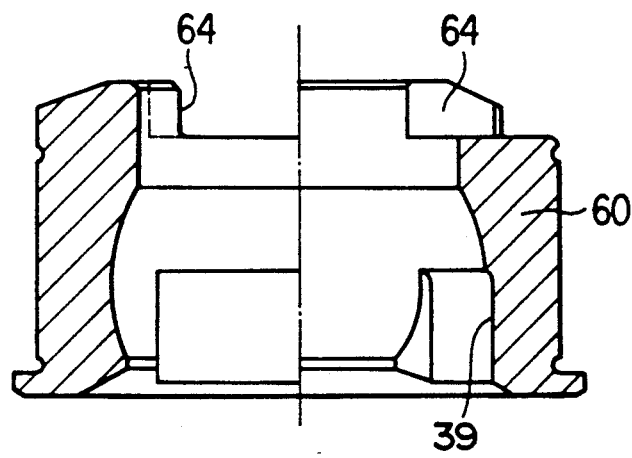
FIG. 12(b) is a sectional view taken along a line 12B—12B in FIG. (a)
Figure 13:
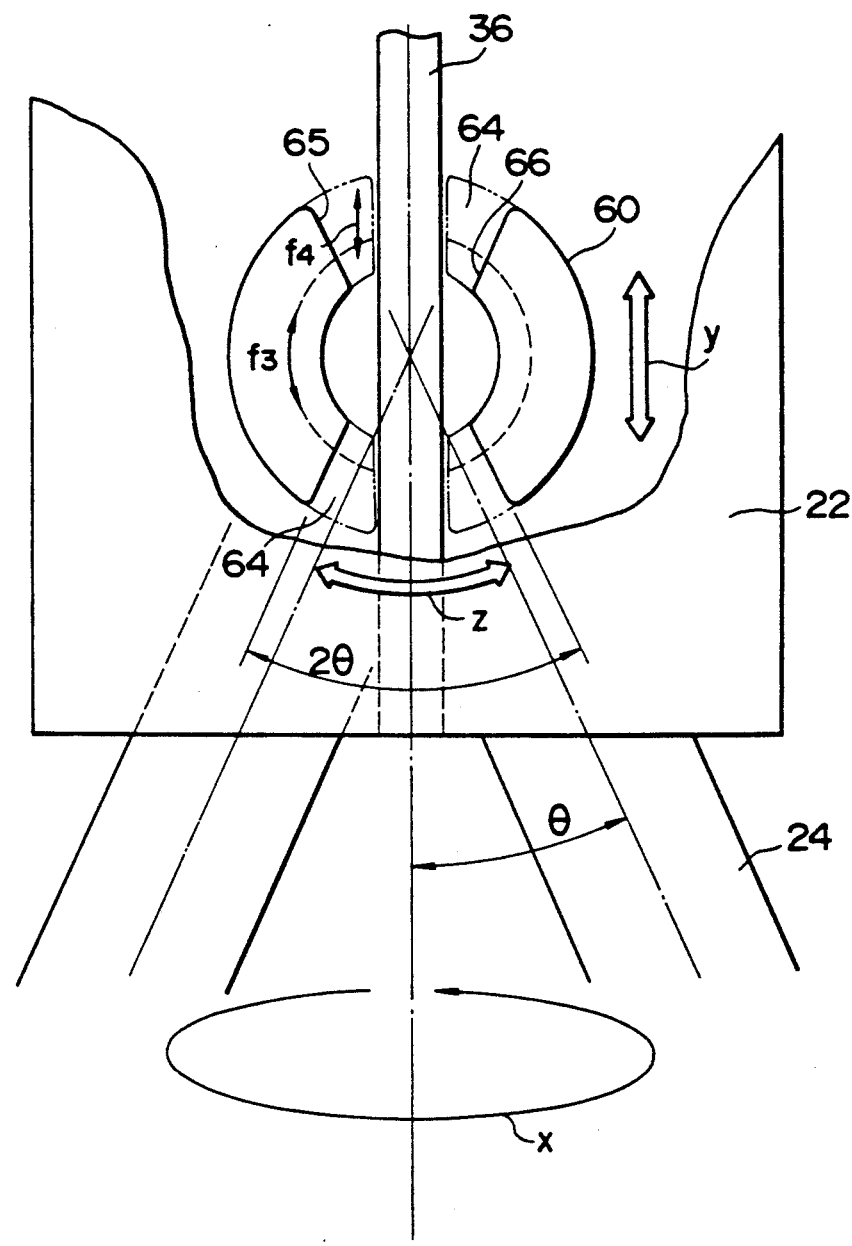
FIG. 13 is a plan view showing the operation of the cage shown in FIG. 12.

As shown in FIGS. 12 and 13, two notches 64 of the cage 60 are provided such that two surfaces 65, 66 of each notch 64 are diverged from the inner peripheral surface toward the outer peripheral surface, similar to the notch 38' shown in FIG. 4.

The two surfaces 65, 66 of the notch 64 are preferably formed as follows: when the two shafts are rotated in the direction x with a joint angle $\theta$, the roller shaft oscillates relative to the first shaft by $2\theta$ per one revolution of the shaft 24, and the roller is moved in the direction y to rotate the cage 60 in the direction z by $2\theta$. Therefore, in order to rotate the cage 60 without being regulated by the rail 36, the notch 64 is determined such that the angle defined by the surfaces 65, 66 results in $2\theta$ in consideration of the width of the rail 36.

If the notch 64 is determined as mentioned above, when the two shafts are rotated with the joint angle made between the two shafts, the cage 60 is rotated by interlocking with the roller shaft, and any sliding movement to a direction does not occur between the cage 60 and the roller shaft. As shown in FIG. 3, in case the notches are formed to have the identical width slightly larger than the width of the rail 36, the cage 60 is positioned by the rail. Therefore, the sliding frictional force $f_3$ is generated between the cage and the roller shaft, and the sliding frictional force $f_4$ is also generated between the notch of the cage and the rail. However, in this embodiment, the generation of such sliding frictional forces is restrained.

Figure 14:
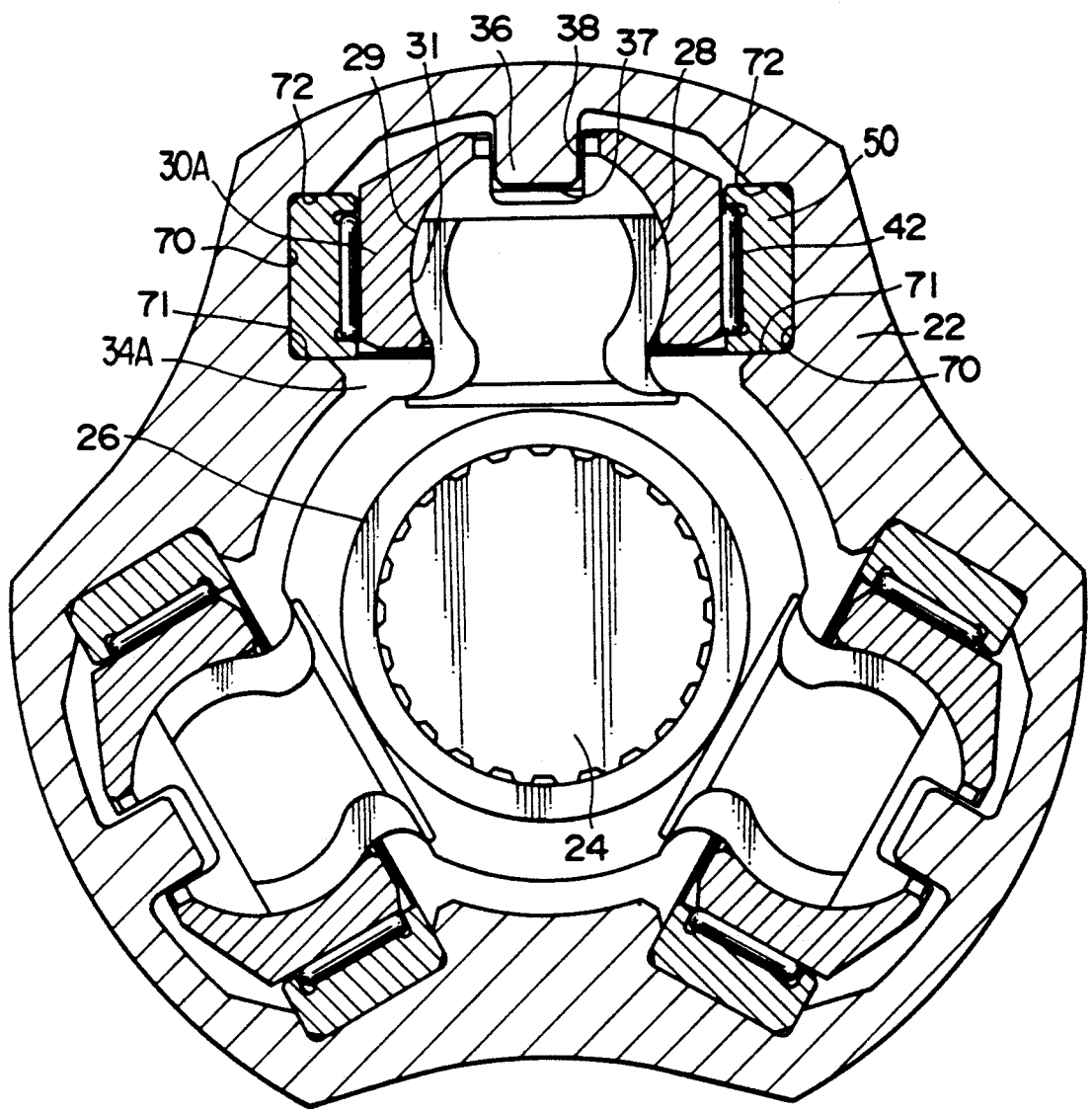
FIG. 14 is a sectional view taken along a plane orthogonal to an axis of a shaft of a still further embodiment of the plunging type constant velocity universal joint according to the present invention.
Figure 15:
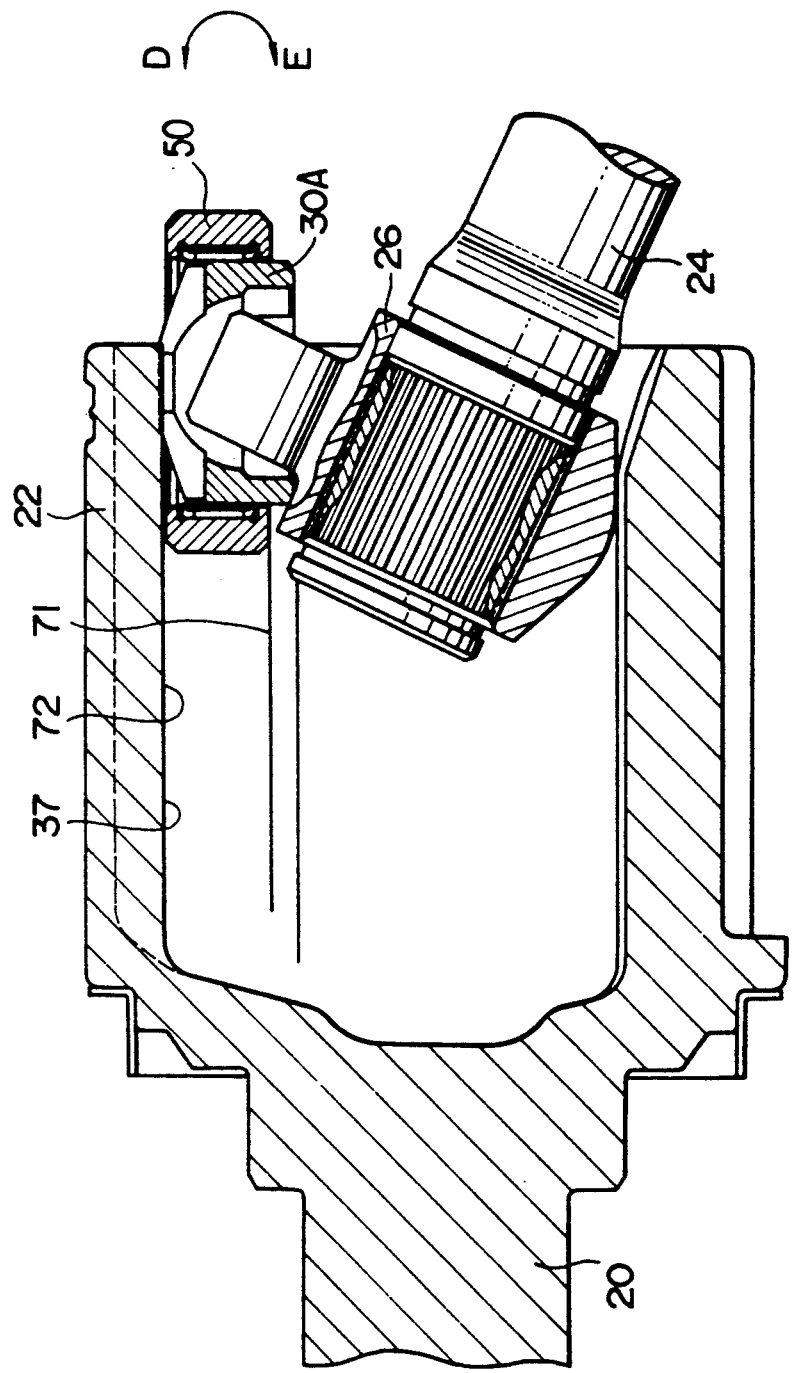
Figure 16:
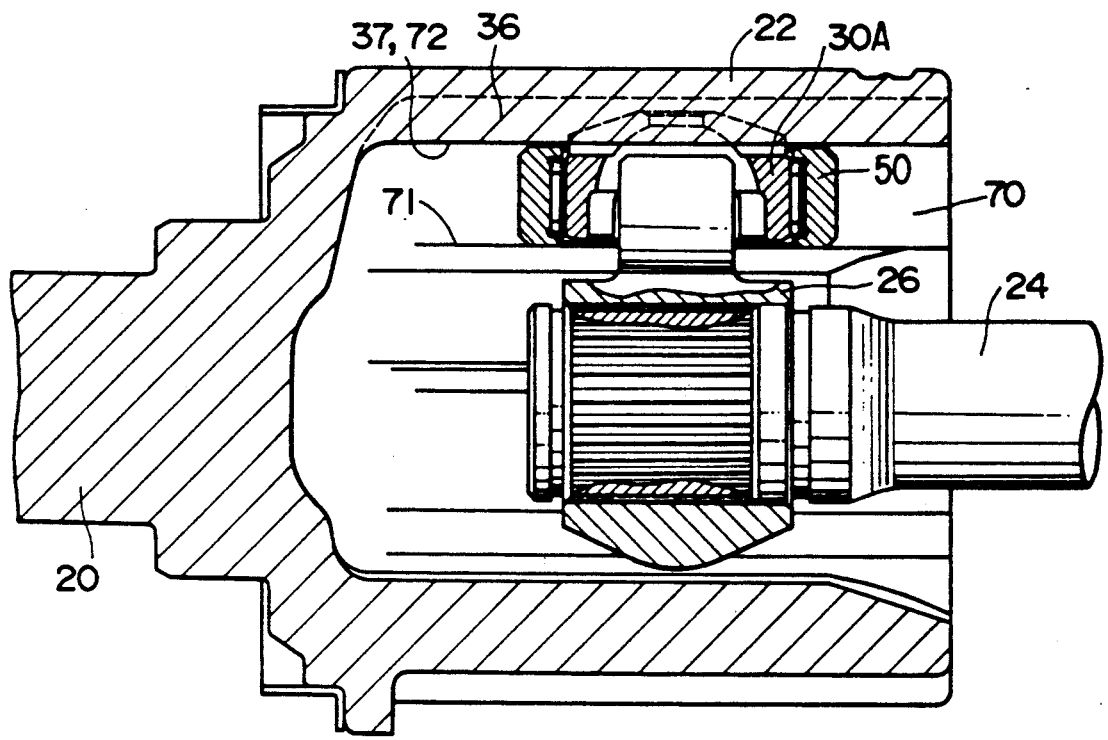
Figure 17:
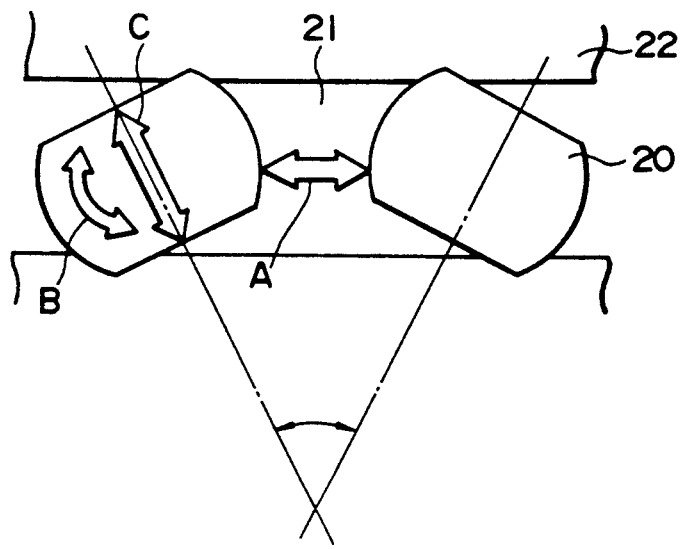
FIGS. 17 through 19 are schematic views for explaining a periodic axial force, respectively.
Figure 18A:
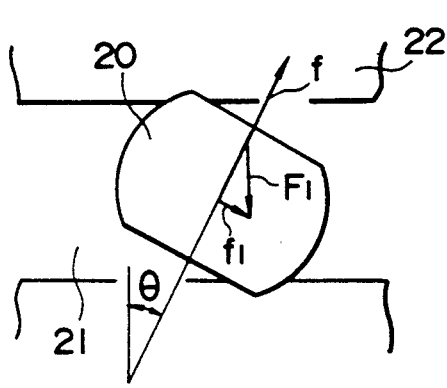
Figure 18B:
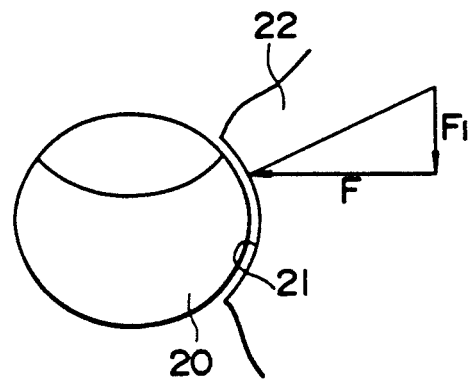
Figure 19:
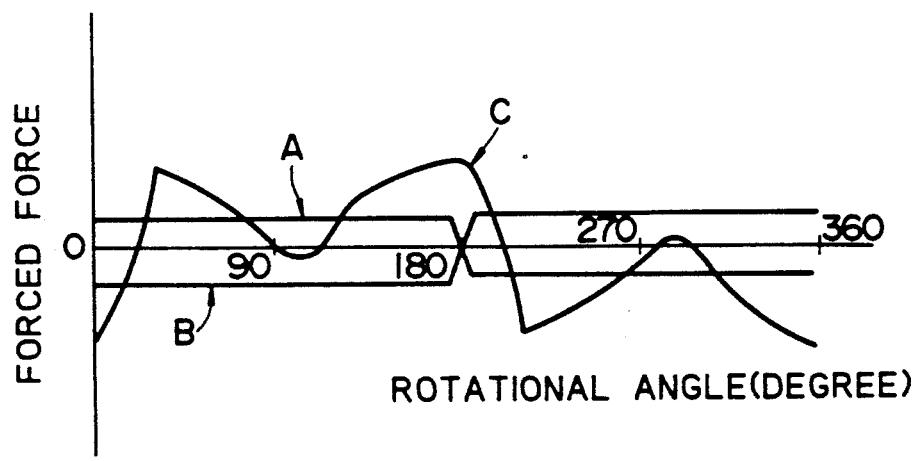

Since the basic constitution of a plunging type constant velocity universal joint shown in FIGS. 14 through 16 is the same as those of the joints shown in FIGS. 1 and 2 and FIGS. 6 and 7, the parts having the same constitution or the same function are designated by the same numerals and symbols, and the detailed description thereof will be omitted.

In this embodiment, each of roller grooves 70 provided in the groove 34A of the outside member has guide surfaces 72 spaced apart from the shoulder 71 in the axial direction of the roller 32. The distance between the shoulder 71 and the guide surface 72 is slightly larger than the length of the roller 50, so that the roller 50 enters the distance between the shoulder 71 and the guide surface 72. In each groove 34A, two guide surfaces 72 at both sides of the groove and the inside surface 37 of the rail 36 at the center of the groove are located on the same plane.

As shown in FIG. 16, when the roller 50 enters the interior of the outside member 22, the roller 50 is prevented from the inclination by the contact of the shoulder 71 of the roller groove 70 with the roller 50 and the contact of the roller 50 with the inside surface 37 of the rail 36. In this case, the effect on the prevention of the inclination of the roller 50 in a main direction (direction D or E in FIG. 15) due to the contact of the roller 50 with the guide surface 72 of the roller groove 70 is such that it does not substantially occur.

As shown in FIG. 15, when the roller 50 is protruded from the opening of the outside member 22, that is, the roller 50 falls into the so-called slide-out condition, the roller 50 is prevented from the inclination relative to the spin in the direction D by the contact of the shoulder 71 of the roller groove 70 with the roller 50 and the contact of the guide surface 72 of the roller groove 70 with the roller 50. Also, the roller 50 is prevented from the inclination relative to the spin in the direction E by the contact of the shoulder 71 of the roller groove 70 with the roller 50 and the contact of the roller 50 with the inside surface 37 of the rail 36. Thus, the prevention of the inclination of the roller 50 when the roller 50 largely slides out is auxiliary done by the guide surface 72. On the contrary, such inclination is prevented by the inside surface 37 of the rail 36 in the normal position of the roller 50, so that the sliding resistance or the like in the normal position is not increased.

what is claimed is:

1. A sliding type constant velocity universal joint, comprising:

an outside member connected to a first shaft having radial and axial directions and provided on an inner periphery thereof with at least three grooves extending in the axial direction of said first shaft at circumferentially equal intervals, each of said grooves having a rail extending in the axial direction of said first shaft and projecting inwardly in the radial direction of said first shaft;

an inside member connected to a second shaft having radial and axial directions, the inside member having roller shafts which have radial and axial directions extending outwardly in the radial direction of said second shaft so as to enter respectively into said grooves, each of the roller shafts being provided on its radially outward periphery with a convex spherical surface;

a cage having radial and axial directions and provided on its radially inward periphery with a concave spherical surface and on its radially outward periphery with a cylindrical surface, the cage being mounted on each of said roller shafts by fitting said concave spherical surface to said convex spherical surface and being provided in a portion facing said rail of the outside member with two notches receiving said rail;

a ring-like roller having radial and axial directions and rotatably supported by each cage and contacting said outside member, the roller being provided on its radially inward periphery with a cylindrical surface having a diameter larger than that of the cylindrical surface of the cage; and regulating means including said rail for maintaining the position of each of said rollers relative to the axis of said first shaft constant when said first and second shafts are rotated under the condition that the axes of the first and second shafts cross each other, an inward surface of the rail coming into contact with an axially outward surface of the roller thereby preventing the roller from moving outwardly in the radial direction of said first shaft;

said cage and said roller being capable of moving relative to each other in the radial direction of said first shaft.

2. A constant velocity universal joint as claimed in claim 1, wherein each of said rollers is rotatably supported by said cage through needle rollers, and provided on the inner peripheral surface with a guide for supporting said needle rollers and a retainer for preventing said needle rollers from dripping out.

3. A constant velocity universal joint as claimed in claim 2, wherein said retainer is formed integrally with said roller as a part of said roller.

4. A constant velocity universal joint as claimed in claim 2, wherein the portion of the outer peripheral surface of said cage adjacent to each of the notches has a convex curved surface toward said needle roller.

5. A constant velocity universal joint as claimed in claim 1, wherein each of said rollers is rotatably supported by said cage through needle rollers, and said cage is provided on the other peripheral surface with a guide for supporting said needle rollers and a retainer for preventing said needle rollers from dropping out.

6. A constant velocity universal joint as claimed in claim 1, wherein each of said two notches is formed to be diverged from the inner spherical surface toward the outer cylindrical surface of said cage.

7. A constant velocity universal joint as claimed in claim 1, wherein said outside member is further provided in each of said grooves with a pair of roller grooves permitting said roller to roll, and said regulating means of said roller is formed of the inward surface of said rail and two shoulders of said roller grooves.

8. A constant velocity universal joint as claimed in claim 7, wherein each said roller groove has a guide surface spaced apart from each said shoulder in the axial direction of said roller, and in each groove the inward surface of said rail and said guide surfaces are located on the same plane.

* * * * *